Feb. 7, 1950 F. W. KRUEGER 2,496,877
METHOD OF AND APPARATUS FOR SEALING CONTAINERS
Filed Feb. 14, 1948 4 Sheets-Sheet 1

FRANK W. KRUEGER
INVENTOR.

BY

ATTORNEY

Feb. 7, 1950     F. W. KRUEGER     2,496,877
METHOD OF AND APPARATUS FOR SEALING CONTAINERS
Filed Feb. 14, 1948     4 Sheets-Sheet 2
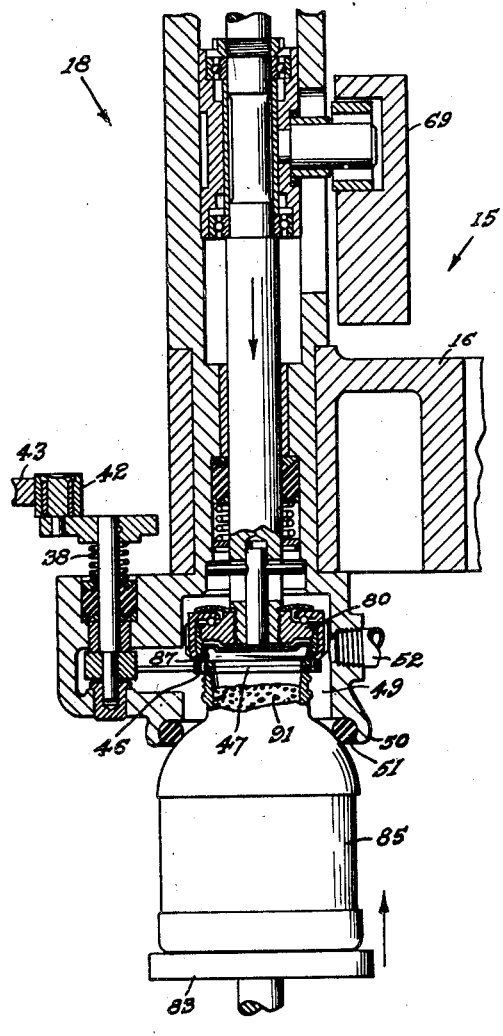
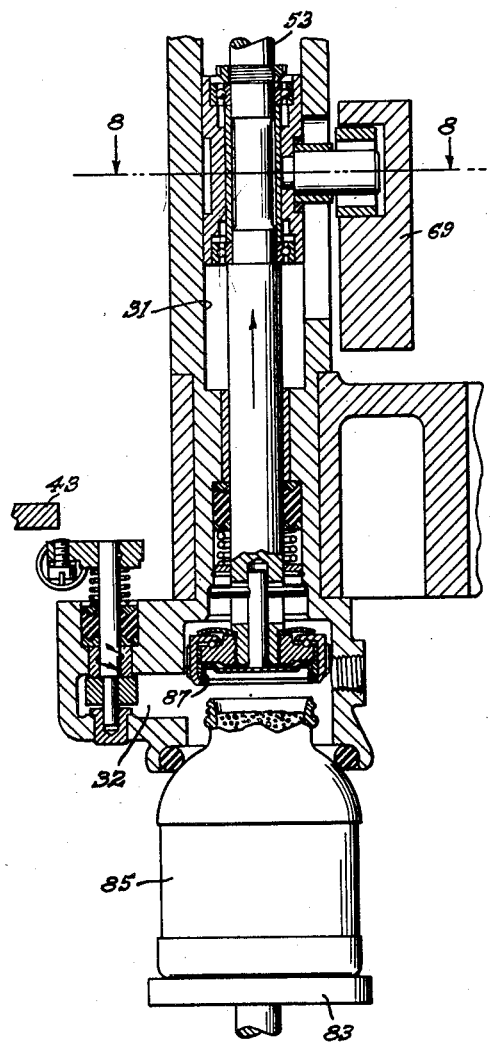
FRANK W. KRUEGER
INVENTOR.
BY
ATTORNEY Feb. 7, 1950            F. W. KRUEGER            2,496,877

METHOD OF AND APPARATUS FOR SEALING CONTAINERS

Filed Feb. 14, 1948            4 Sheets-Sheet 3

FRANK W. KRUEGER
INVENTOR.

BY

ATTORNEY

Feb. 7, 1950      F. W. KRUEGER      2,496,877
METHOD OF AND APPARATUS FOR SEALING CONTAINERS
Filed Feb. 14, 1948      4 Sheets-Sheet 4
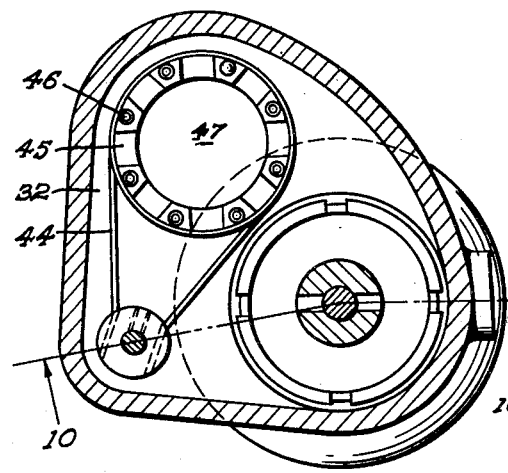
FIG. 7
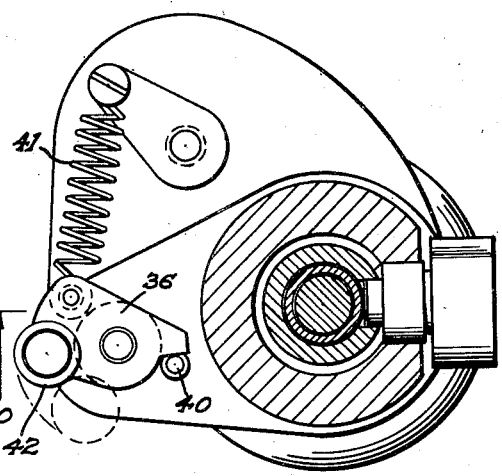
FIG. 8
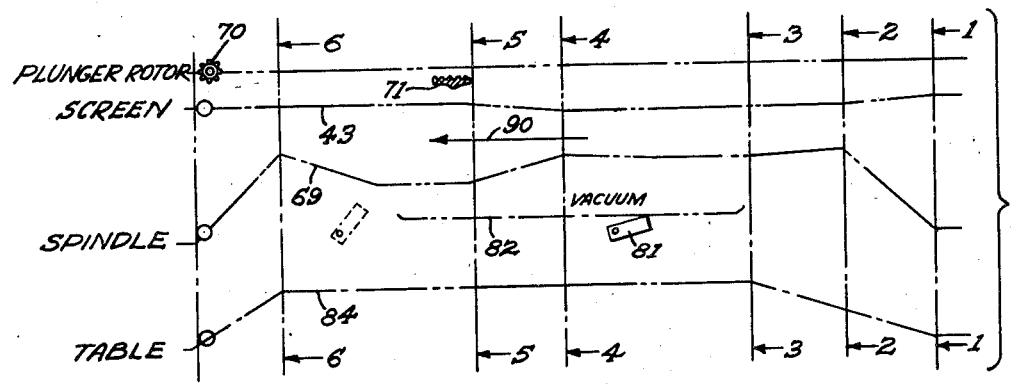
FIG. 9
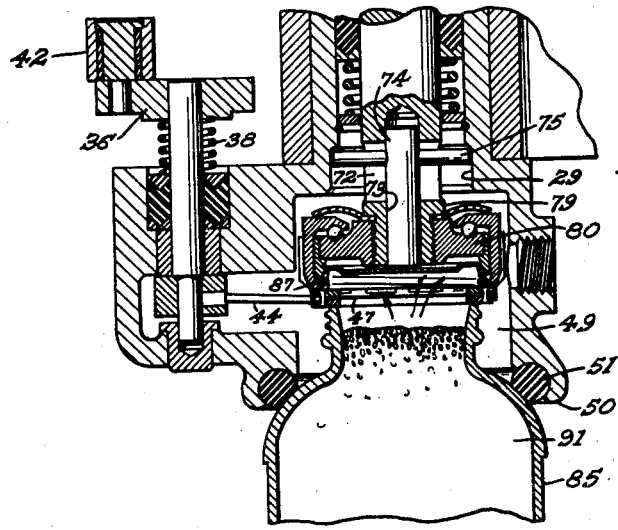
FIG. 10
FRANK W. KRUEGER
INVENTOR.
BY 
ATTORNEY Patented Feb. 7, 1950

2,496,877

UNITED STATES PATENT OFFICE 2,496,877

METHOD OF AND APPARATUS FOR SEALING CONTAINERS

Frank W. Krueger, Saratoga, Calif., assignor to Food Machinery and Chemical Corporation, a corporation of Delaware Application February 14, 1948, Serial No. 8,341

8 Claims. (Cl. 226—82)

This invention relates to the art of sealing containers and particularly to the art of capping containers under vacuum. It is particularly useful in vacuum capping containers where the containers have packed therein a granular or powdered product.

In vacuum capping, a vacuum chamber surrounding the open end of the container is provided. This chamber also includes a cap which is applied to the container after a vacuum is drawn on the chamber and through this on the interior of the container.

Where the product packed in the container is of a light granular or powdered consistency, such as is found in coffee or baking powder, the evacuation step must be performed slowly to prevent particles of the product being withdrawn from the container along with air escaping from the body of the product. This not only constitutes a waste, but causes the product to become lodged between the container and the cap and renders the seal imperfect.

It is an object of this invention to provide a method of and apparatus for vacuum sealing containers with caps which will permit the evacuation of air from the container to be done with rapidity and yet avoid withdrawing particles of the product from the container and under the conditions noted.

It is another object of the invention to provide such a method of and apparatus for vacuum sealing containers with caps which will not require any alteration in the design of either cap or container so that standard caps and standard containers may be employed in the operation of this invention.

The manner of accomplishing the foregoing objects as well as further objects and advantages will be made manifest in the following description taken in connection with the accompanying drawings in which:

Fig. 1 is a diagrammatic fragmentary vertical sectional view of a single capping unit of a rotary vacuum capper well known in the art but modified, as will be more fully described hereinafter, to incorporate a preferred embodiment of the apparatus of the invention and to perform the method thereof. This view illustrates the cap chuck in the act of picking up a cap and the container feed in the act of feeding a jar packed with product into place beneath and in alignment with said chuck.

Fig. 2 is a view similar to Fig. 1 showing the chuck and cap in elevated position, with the product screen of the invention swung into place just beneath the cap, and with the container elevator lifting said jar upwardly in axial alignment with said chuck, cap and screen.

Fig. 3 is a view similar to Fig. 2 and shows the jar raised by its elevator to the point where the jar makes a sealing contact with a seal ring about the entrance to a vacuum chamber of said unit and at the same time, contacts the filter screen so that the latter is compressed between the annular lip of the jar mouth and the cap. Upon this taking place, a vacuum is imposed on said vacuum chamber in the well known manner by the machine embodying said unit so as to evacuate the air from said jar outwardly through said screen.

Fig. 4 is a view similar to Fig. 3 and illustrates successive steps in which the cap chuck and cap are lifted to free said screen and the latter is swung out from between said cap and said jar while remaining within said vacuum chamber.

Fig. 7 is an enlarged horizontal sectional view taken on the line 7—7 of Fig. 6 and showing the screen retracted to its inoperative position in the vacuum chamber.

Fig. 8 is a view corresponding in scale to Fig. 7 and taken on the line 8—8 of Fig. 4 and illustrating the screen-cam-following roller and the return operating spring for said screen.

Fig. 9 is a diagram of the annular cams employed to actuate the various elements of the capping units as these turn with the capper rotor on which they are mounted.

Fig. 10 is a fragmentary enlarged view of the lower portion of Fig. 3 and illustrates the detail structure of the cap chuck and product screen of the invention.

Figure 1:
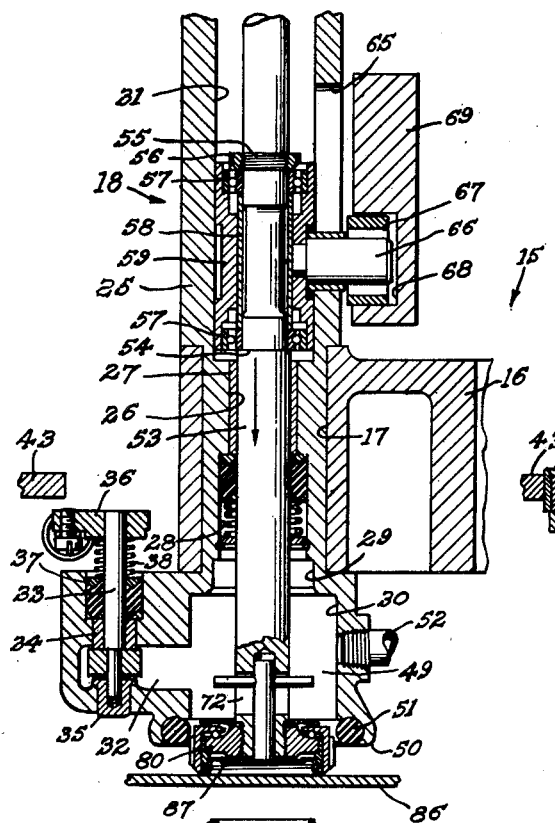

Referring specifically to the drawings, it is to be noted that, as rotary vacuum cappers are well known in the art, the disclosure of the apparatus of the present invention is restricted to those elements of such a capper which are modified in producing said apparatus.

The invention is disclosed as embodied with a capper 15 having a capping rotor 16, the latter having a series of vertical holes 17 close to its periphery in which are mounted capping units 18.

Each of these capping units functions to apply screw caps to jars after imposing a vacuum on the contents of the jar so that the contents of the jar are thus sealed up in a vacuum.

It is to be understood, of course, that the present invention is not limited to vacuum capping with screw caps but extends to vacuum capping in general no matter what type of cap is employed as a closure.

The units 18 are identical, one of these being illustrated in various phases of its operation in Figs. 1 to 6, inclusive. The unit has a body 25 which is rigidly fixed in one of the rotor holes 17. This body has a bore 26 into which is pressed a bearing sleeve 27, this bore having counter-bores 28, 29 and 30 connecting to its lower end and a counter-bore 31 connecting with its upper end.

The counter-bore 30 has a screen receiving room 32 extending horizontally therefrom through which a vertical shaft 33 extends, the shaft journalling in bearings 34 and 35 provided in the unit body 25, this shaft having an arm 36 fixed on its upper end.

Provided on the body 25, above the bearing 34, is a stuffing box 37 which is maintained in tight operating condition by spring 38 coiled about said shaft 33 and compressed between the arm 36 and said stuffing box.

Looking downwardly on the arm 36 (as in Fig. 8) it will be noted that rotation of this arm is limited by a stop 40 and that a spring 41 constantly urges the arm 36 to rotate clockwise, this motion terminating with the engagement of the arm with the stop 40. The arm 36 carries a cam-following-roller 42.

Mounted on the frame of the capper 15 is a cam 43 which is positioned to be engaged by the roller 42 to actuate the arm 36 in a manner and for a purpose to be made clear hereinafter.

Fixed on the shaft 33 so that it can be swung into a position in which it lies entirely in the room 32 (as shown in Fig. 7) when the roller 42 is engaged by the cam 43, is a screw arm 44 which includes a circular frame 45 in which vertical air escape holes 46 are provided and in which is framed a fine meshed wire screen 47.

The interior of the counter-bore 30 and the room 32 constitutes a vacuum chamber 49 having a lower mouth 50 in which is mounted a circular seal 51. Screwed into a threaded hole in the wall of this chamber, so as to connect therewith for the purpose of imposing a vacuum thereon, is a pipe 52.

Journalling in the bearing sleeve 27 is a capper unit chuck spindle 53 which is turned down at its upper end to provide a shoulder 54 and threads 55 on which a nut 56 is screwed to trap bearings 57 and a sleeve 58 between this nut and shoulder 54. Rotatably mounted on these bearings is a cam-follower-mount 59 which is closely slideable in the counter-bore 31. Fixed on this mount, and extending inwardly through a vertical slot 65 in the inner wall of the counter-bore 31, is a stub shaft 66 carrying a cam-follower-roller 67 which follows the channel 68 in an annular chuck spindle cam 69.

Fixed concentrically therewith on the upper end of the spindle 53 is a cam-following pinion 70 (see Fig. 9). Fixed on the frame of the capper 15, to be engaged by each of the pinions 70 in a particular zone of its rotation with the rotor 16, is a gear sector 71. When a pinion 70 is thus engaged it causes temporary rotation of the spindle 53 on which this pinion is fixed.

The lower end of the spindle 53 has a slot 72 and an axial hole 73. Slidable in the hole 73 is a knock-out pin 74, this pin having a cross pin 75 mounted therein so that this cross pin rides in the slot 72 and is freely received in the counter-bore 29.

The lower end of the spindle 53, below the slot 72, is turned down to provide a shoulder 79 and threaded, a screw cap chuck 80 being screwed tightly thereon against said shoulder.

The vacuum pipe 52 connects through a valve (not shown) to a source of vacuum on the rotor, said valve being actuated by an arm 81 which rides on the cam 82 so as to operate said valve to impose a vacuum on the chamber 49 between the full line position of the arm 81 in Fig. 9 and its dotted line position shown in this view.

Also provided on the capping rotor 16 is a series of jar elevating tables 83 which are elevated vertically by an annular cam 84 while supporting a packed jar 85.

The capper 15 includes a cap feeder plate 86 which extends into the path of the capping units as these turn with the rotor to position the cap 87 resting on the plate 86 directly beneath and in alignment with this capper unit so that, as the spindle 53 is lowered by the cam 69 as shown in Fig. 1, the chuck 80 moves down on the cap 87 and expands to receive this cap and then lifts it from the plate 86 as the spindle 53 rises.

The capper 15 has a feeder (not shown) for delivering filled jars 85 onto the tables 83 on the rotor at a given point in its rotation and to receive these jars from said tables after they have been capped.

*Operation*

The stationary cams shown in Fig. 9 are viewed diagrammatically and in elevation as if they were unwrapped from around the frame of the capper. In this view, the direction of motion of the rotor, with respect to the cams, is indicated by the arrow 90. The positions of the section lines for Figs. 1, 2, 3, 4, 5, and 6, appearing on Fig. 9, indicate the location of the capping unit, with reference to said cams at each of the particular moments illustrated respectively in said sectional views.

For instance, Fig. 1 shows the chuck picking up a cap. By this time, a jar filled with a loose light granular material, such as coffee 91, has been fed onto the elevator table 83 and this table is rising due to the action of cam 84. At this time, the screen 47 is in retracted position in the screen room 32 as shown in Fig. 7.

Figure 2:
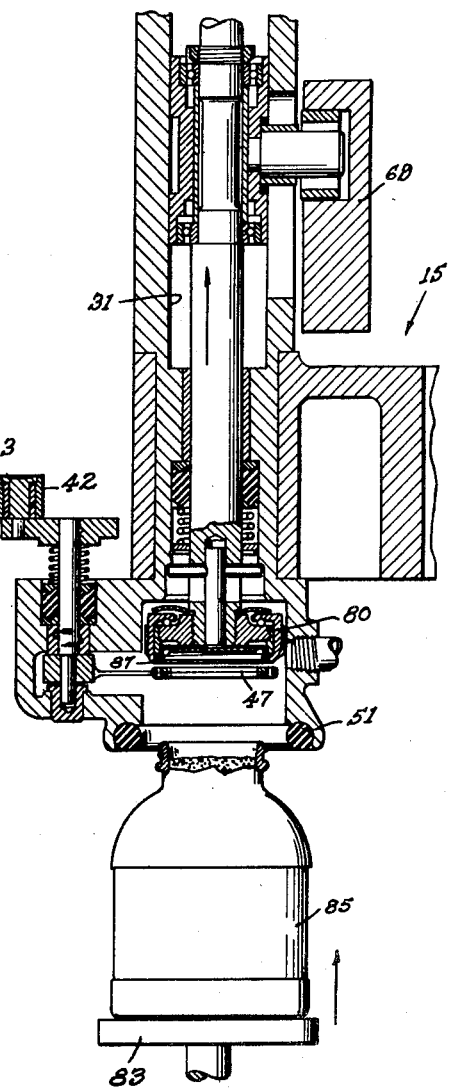

The spindle 53 rises quickly when this unit moves from the position in which it is shown in Fig. 1 to the position in which it is shown in Fig. 2. Simultaneous with this movement, the cam 43 engages the roller 42 to swing the screen 47 into vertical axial alignment with and immediately beneath the chuck 80. In this view, the table 83 is still lifting the jar 85 but has not as yet brought it into contact with the seal 51.

In Fig. 3, the position of the screen is unchanged while the chuck 80 has moved downwardly, pressing the cap 87 against the upper face of the screen frame 45, while the arrival of the table 83 in its upwardmost position has brought the jar into snug sealing engagement with the seal 51 about the mouth 50 of the chamber 49.

At a point immediately following that shown in Fig. 3, the arm 81 of the vacuum valve engages the cam 82 to impose a vacuum through the pipe 52 upon the chamber 49. This extracts the air from within the interstices within the coffee 91 in the jar 85 which flows upwardly through the screen 47 into the cap 87 and downwardly out of this cap through the holes 46 in the screen frame 45.

Just before reaching the point illustrated in Fig. 4, the cam 69 lifts the spindle 53 and chuck 80 to free the screen 47 from pressure and the cam 43 then swings the screen into retracted position within the screen room 32.

Figure 5:
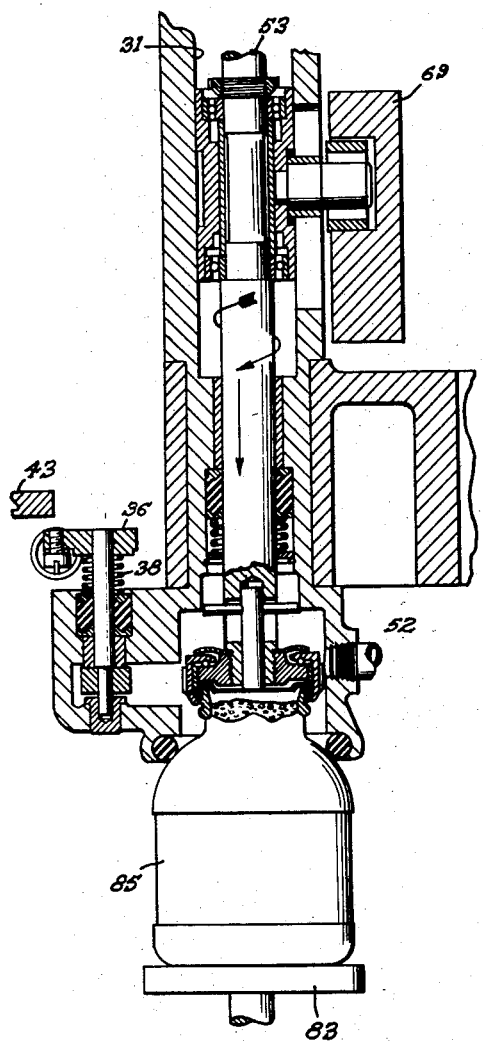
Fig. 5 is a view similar to Fig. 4 and illustrates the next step of the method of this invention in which said chuck is being rotated to screw said cap onto said jar in the presence of said vacuum in said chamber.
Figure 6:
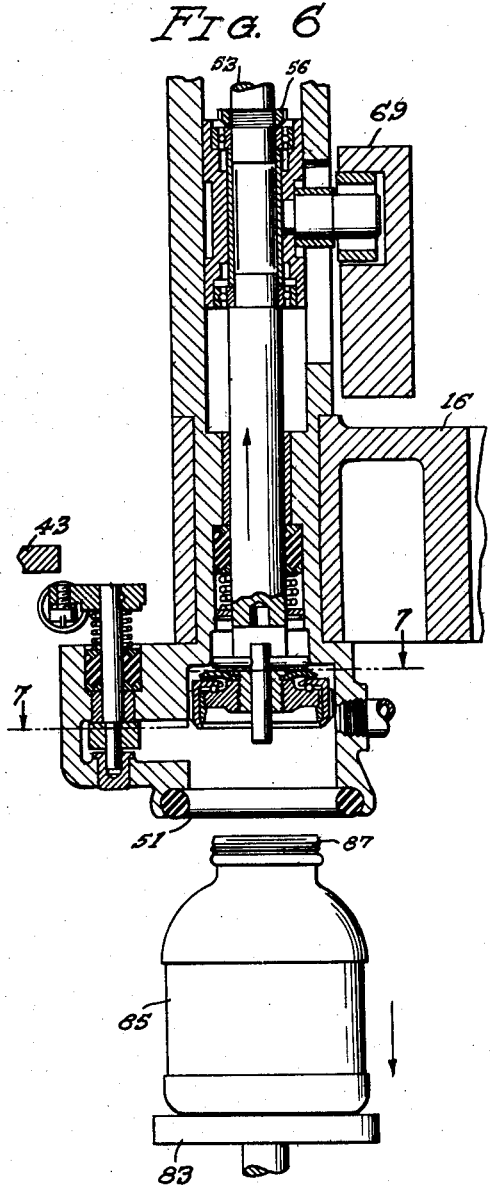
Fig. 6 is a view similar to Fig. 5 showing the cap chuck lifted to free itself from said cap and the elevator descending with the capped jar, thus withdrawing the jar from the vacuum chamber.

Immediately following Fig. 4, the spindle 53 is lowered by the cam 69 as shown in Fig. 5, to allow the cap to rest on the threaded neck of the jar 85. The pinion 70 on the spindle 53 now engages the gear sector 71 which rotates the chuck 80 and screws the cap 87 on the jar. This takes place while the chamber 49 and interior of the jar 85 are still under vacuum so that with the screwing on of the cap 87, the contents thereof are vacuum sealed therein.

Immediately following the capping of the jar, the vacuum is broken by the valve arm 81 riding off the cam 82. The spindle 53 is then lifted to separate the chuck 80 from the cap 87 and the table 83 starts downwardly, breaking contact between the jar and the seal 51. In this chuck lifting movement, the spindle rises high enough so that in case no jar had been fed onto the table 83 for this particular operation, the knockout pin 74 would knock the cap from the chuck 80 thereby clearing the chuck for receiving the cap next to be presented to it upon its descending into cap receiving position as shown in Fig. 1.

As the table 83 descends to its lowermost position, suitable means are provided for removing the vacuum capped jar 85 from the table so that this table will be free to receive another filled jar upon arriving at the jar feeding point. A full cycle of operation of a capping unit 18 has now been described.

It is to be noted that the interposition of the screen 47 between the cap 87 and the jar 85 during the imposing of a vacuum on the contents of the jar prevents the light dry granular material in the jar from being blown out of the mouth of the jar by the rush of air escaping from the latter. Any granules tending to be blown upwardly by the air are caught by the screen and fall backward into the jar. The material packed in the jar is thus retained therein and not wasted.

Although but a single preferred embodiment of the invention is shown and described herein, it is to be understood that many modifications may be made in this without departing from the spirit of the invention or the scope of the appended claims.

The claims are:

1. In a method of vacuum capping containers having a loose granular product packed therein, the steps of: covering the mouth of said container with a screen of finer mesh than the particles of said product; forming a vacuum chamber about the mouth of said jar; positioning a cap for said jar in said chamber in alignment with said container mouth; pressing said cap against said screen to press the latter against the mouth of said container; imposing a vacuum on said chamber to evacuate air outwardly from said container and through said screen; releasing said screen from the pressure of said cap; removing said screen from between said cap and said mouth; and advancing said cap toward said container while maintaining the vacuum in said chamber whereby said mouth of said container is sealed to maintain the vacuum thus induced within said container.

2. In an apparatus for vacuum capping containers, the combination of: means for forming a vacuum chamber about the mouth of a container; a screen disposed in said chamber; means for positioning said screen in covering relation with said mouth; means imposing a vacuum on said chamber with said screen so disposed; means for removing said screen from covering relation with said container mouth; and means extending into said chamber for capping said mouth of said container while said vacuum is maintained in said chamber.

3. A combination as in claim 2 having a shaft rotatably mounted on the means forming said chamber and in which said means for actuating said screen is disposed outside said chamber and operates said screen through said shaft.

4. A combination as in claim 2 having a shaft rotatably mounted on the means forming said chamber and in which said means for actuating said screen is disposed outside said chamber and operates said screen through said shaft, said screen being mounted on said shaft and swung into and out of covering relation with said mouth by rotation of said shaft.

5. In a rotary vacuum capper, the combination of: a rotor having a plurality of capping units provided thereon and turning therewith, each of said units including a body having a vertical operating axis and a vacuum chamber formed in a lower portion of said body, said vacuum chamber having a hole opening axially downwardly therefrom, a seal ring provided in said body and encircling said hole, an elevator for lifting a container upwardly to extend a mouth portion of said container into said chamber and cause said container to engage said seal ring and thereby close said hole; capping means mounted axially in said body and adapted to hold a cap within said chamber and apply said cap to said container to close the mouth of the latter; a screen disposed horizontally in said chamber and shiftable therein between a position in axial alignment with said container and a position out from between said container and said cap; means extending outside said body for shifting said screen between its concentric relation with said container and its inoperative position; and stationary cam means rendered operative by rotation of said rotor to actuate said elevator, said cap means and said screen actuating means and said means for imposing a vacuum on said chamber, to withdraw said capping means upwardly in said chamber, to elevate said container into closing relation with said seal ring thereby closing said vacuum chamber off from the atmosphere, to swing said screen into its operative position aforesaid, to lower said capping means to press said screen against said container mouth, to impose a vacuum on said chamber, to lift said capping means to release said screen, to swing said screen to its inoperative position, to advance said capping means to cap said container, to withdraw said capping means from said container leaving the cap on the container, to break said vacuum in said chamber, and to lower said elevator and the capped container in readiness to discharge said container from said machine.

6. In a rotary vacuum capper, the combination of: a rotor having a plurality of vacuum capping units thereon; means in each unit to form a vacuum chamber about a mouth portion of a container; means for imposing a vacuum on said chamber; means for capping said container while said vacuum is maintained in said chamber; a screen in said chamber; and means responsive to the rotation of said rotor for shifting said screen in said chamber between operative and inoperative positions, said screen covering the mouth of said container in said operative position.

7. In a rotary vacuum capper, the combination of: a rotor having a plurality of vacuum capping units thereon; means in each unit to form a vacuum chamber about a mouth portion of a container; means for imposing a vacuum on said chamber; means for capping said container while said vacuum is maintained in said chamber; a screen in said chamber; means responsive to the rotation of said rotor for shifting said screen in said chamber between operative and inoperative positions, said screen covering the mouth of said container in said operative position; and means for utilizing said capping means to press said screen against said container mouth when said screen is disposed thereover.

8. A combination as in claim 7 in which said screen has a circular frame with perforations for permitting air to be withdrawn from inside said cap thereby impressing a vacuum through said screen on the interior of said container.

FRANK W. KRUEGER.

REFERENCES CITED

The following references are of record in the file of this patent:

UNITED STATES PATENTS

| Number | Name | Date |
| --- | --- | --- |
| 1,149,844 | Lieber | Aug. 10, 1915 |
| 2,120,272 | Williams et al. | June 14, 1938 |
| 2,126,942 | Barnby | Aug. 16, 1938 |
| 2,170,469 | Carter | Aug. 22, 1939 |